United States Patent [19]

Overbeek et al.

[11] Patent Number: 5,292,660
[45] Date of Patent: Mar. 8, 1994

[54] REMOVAL OF RESIDUAL MONOMERS FROM POLYMERS USING PEROXIDE-GENERATING ENZYME

[75] Inventors: Gerardus C. Overbeek, Sprang-Capelle; Yvonne W. Smak, Nieuwegein, both of Netherlands

[73] Assignee: ICI Resin BV, Waalwijk

[21] Appl. No.: 905,820

[22] Filed: Jun. 29, 1992

[30] Foreign Application Priority Data

Jun. 27, 1991 [GB] United Kingdom ............... 9113912

[51] Int. Cl.$^5$ ............................................. C08F 6/16
[52] U.S. Cl. ................................... 435/262; 210/632; 528/491
[58] Field of Search ................. 524/21, 26, 819; 525/54.1, 54.11; 528/491; 435/262; 210/632

[56] References Cited

U.S. PATENT DOCUMENTS

| | | | |
|---|---|---|---|
| 3,897,308 | 7/1975 | Li et al. | 435/262 |
| 4,133,752 | 1/1979 | Kurane et al. | 435/262 |
| 4,301,264 | 11/1981 | Moore et al. | 526/65 |
| 4,623,465 | 11/1986 | Klibanov | 210/632 |
| 4,766,173 | 8/1988 | Bailey et al. | 528/486 |
| 4,794,166 | 12/1988 | Engelhardt et al. | 528/492 |
| 5,110,740 | 5/1992 | Pokora et al. | 435/262 |

FOREIGN PATENT DOCUMENTS

| | | |
|---|---|---|
| 0003957 | 9/1979 | European Pat. Off. |
| 0273651A3 | 7/1988 | European Pat. Off. |
| 321872 | 12/1988 | European Pat. Off. |
| 0321872A3 | 6/1989 | European Pat. Off. |
| 0416864 | 3/1991 | European Pat. Off. |
| 9115520 | 10/1991 | PCT Int'l Appl. |

*Primary Examiner*—Joseph L. Schofer
*Assistant Examiner*—Tom Weber
*Attorney, Agent, or Firm*—Cushman, Darby & Cushman

[57] ABSTRACT

Method for removing radically-polymerisable unsaturated monomer from a dispersion of a polymer, made by non-enzymic polymerisation, by treating the polymer dispersion with a peroxide-generating enzyme (such as an oxidase) and an enzyme substrate(s), and usually oxygen, optionally with a reducing agent, under conditions to effect a reduction in the level of the residual monomer.

29 Claims, No Drawings

REMOVAL OF RESIDUAL MONOMERS FROM POLYMERS USING PEROXIDE-GENERATING ENZYME

The present invention relates to a method for the removal of residual free radical-polymerisable monomeric material from a polymer.

The preparation of a great variety of different polymers using processes such as free radical polymerisation is well known and exhaustively documented in the prior art literature. Such processes may be conventionally effected by (co)polymerising at least one olefinically unsaturated monomer, appropriately dispersed (e.g. dissolved or, more usually, emulsified or suspended) in a liquid medium (often an aqueous medium), where initiation of the polymerisation reaction (in the case of free radical polymerisation) occurs by virtue of the presence of an initiator compound(s) (or initiator system) which generates initiating free radicals under the conditions employed for the polymerisation. The initiator is conventionally a peroxide (this term including persulphates) or azo compound, and the generation of radicals by decomposition thereof may be effected thermally or photolytically by using an appropriately elevated polymerisation temperature or a radiation source and/or by the use of suitable accelerator compounds, normally reducing agents such as metal salts. The resulting product is a polymer dispersed in a liquid medium, e.g. a solution, emulsion (latex), or granular suspension of the polymer in the medium. The liquid medium is often an aqueous medium, i.e. a liquid medium of which the principal constituent is water, although minor amounts of organic liquids may be present if desired or necessary. Thereafter the liquid medium may be removed if desired so as to isolate the polymer, although in many applications the polymer is used as the dispersion from polymerisation.

The (co)polymerisation of olefinically unsaturated monomer(s) to (co)polymer rarely proceeds to completion and there is inevitably a level of unreacted (residual) monomeric material remaining at the end of the polymerisation, which can in some cases be relatively high (e.g. from a few hundred to up to several thousand parts per million, based on the weight of monomeric material employed in the polymerisation). The presence of such residual monomer is in many cases highly undesirable. In some cases, the residual monomer may be highly toxic; for example, vinyl chloride (present after the formation of the highly versatile thermoplastic polyvinyl chloride) is now known to be a carcinogen, and acrylonitrile (present after the formation of acrylonitrile polymers) is extremely toxic. In other cases, for instance, the residual monomer imparts an undesirable odour. For example methyl, ethyl, butyl and higher acrylates and methacrylates can be polymerised to form plastics especially thermoplastics materials having a wide range of uses. In particular these materials find extensive applications in coating compositions, e.g. paints, varnishes and stains and in wall covering materials, and in compositions such as adhesive and ink compositions. The utility of acrylate and methacrylate polymers is limited to some extent because they are generally contaminated with unreacted acrylate and methacrylate monomers which, particularly in the case of ethyl and butyl acrylates, can impart an unpleasant smell to the polymer. The unreacted monomer may be present in amounts up to 1000 or 2000 ppm (or higher) in some polymers. Contamination with unreacted monomer is particularly a problem when the polymer is used in paints and wall coverings when the smell is especially noticeable. This problem has for some considerable time concerned manufacturers of paints and wall coverings. Contamination with unreacted monomer is also a problem in food applications where plastics films are normally coated with a polymer dispersion or solution.

Various methods have been utilised or proposed to remove residual monomeric material from polymers. For example, it is known to remove residual vinyl chloride monomer from aqueous suspensions of polyvinyl chloride by steam stripping techniques (often under reduced pressure)—using equipment such as sieve plate stripping columns. However such techniques often tend to be expensive because of the high cost of the equipment employed, and are only applicable for volatile monomers. Also steam stripping tends to increase the sediment level, and may be environmentally unsound unless special precautions are taken to prevent the monomers entering the atmosphere.

Another method that has been proposed to reduce the residual monomeric material from polymers is to use one or more post polymerisation reactions with initiators, either in the presence of reducing agents or not, usually at elevated temperatures. Normal post reactions to reduce the residual monomer content employ radical-forming compounds such as persulphates or other peroxide compounds, in the presence or absence of reducing agents. Normally, such reactions are effected at elevated temperatures (typically between 30° and 95° C., more usually between 60° and 90° C.). Radical formation takes place in the liquid phase (e.g. the aqueous phase) whereas the residual monomers are located within the polymer particles. Since the residual monomer reduction in such a process is to a significant extent a diffusion controlled process, its efficiency is not very good. Furthermore, such post reactions tend to increase sediment levels (due to the resulting colloidal instability). As will be seen hereinafter, an advantage of the present invention is that it can allow the generation of radicals at a low concentration over a long period of time, so that effective diffusion has sufficient time to take place (in cases where diffusion is the rate determining step—as is usual). Also, no problems with colloidal or shear stability will occur.

Proposed methods for removing unreacted monomers from acrylate and methacrylate polymers have suggested using chemical treatments including those disclosed in U.S. Pat. No. 4,766,173 (treatment with cysteine and lysine), European Published Patent Application 0273651A (treatment with a scavenger monomer such as vinyl acetate) and German Offenlegenschrift 3635367. Nevertheless it is believed that these techniques do not provide a fully satisfactory solution to the problem.

We have now discovered that residual radically-polymerisable monomeric material can be effectively removed from polymers by the use of certain enzymes.

According to the present invention there is provided a method for the removal of free radical-polymerisable olefinically unsaturated monomer or monomers from a dispersion in a liquid medium of a polymer prepared from at least one olefinically unsaturated monomer using a polymerisation process which does not employ an enzyme and containing a residual level of free radical-polymerisable olefinically unsaturated monomer or monomers used in said polymerisation process, wherein said method comprises treating the dispersion with a peroxide-generating enzyme and an enzyme substrate(s) for the enzyme under conditions where they effect a reduction in the level of said residual monomer or monomers in the dispersion.

There is also provided according to the present invention a dispersion of polymer in a liquid medium which has been treated to remove residual monomer or monomers using a method as defined supra.

It is presumed that the method of the invention is operative by virtue, under the conditions of treatment, of the production of a peroxide and the formation of free radicals from the peroxide which effect polymerisation of residual monomer or monomers in the dispersion as manifested by a reduction in the level thereof.

The polymerisation of olefinically unsaturated monomer or monomers to form the dispersion of the polymer (which can be an emulsion suspension or solution or the polymer in the liquid medium), which polymer can be a homo or a copolymer, will be effected by techniques other than enzymic polymerisation, and will normally be performed by conventional polymerisation processes involving a free radical initiation mechanism as described supra, and in particular by using a conventional initiator or initiator system (e.g. based on a peroxide, this term including persulphate, or azo compound) in which the initiating radical species are generated thermally or photolytically optionally in conjunction with an accelerator material. As also mentioned supra, the liquid medium is often an aqueous medium (in which water is the principle component, although minor amounts of organic liquids, perhaps acting as cosolvent(s), may optionally be present), and the resulting polymer dispersion is in particular an aqueous emulsion of the polymer (i.e. a polymer latex) or an aqueous suspension of the polymer—more usually a polymer aqueous emulsion. The polymer dispersion could also be a solution of the polymer in the liquid (preferably aqueous) medium.

(It is, nevertheless, conceivable that the polymer could be prepared by techniques other than free radical polymerisation, e.g. by anionic or group transfer polymerisation. The method of the invention could still be used, after dispersing the polymer in a liquid medium, if the residual olefinically unsaturated monomer were radically polymerisable).

The method of the invention allows a facile, efficient, and cost effective removal of a very high proportion of residual monomeric material; moreover the removal is normally effected at relatively low temperatures and ambient temperature is often sufficient.

It may here be mentioned that we are aware of the disclosure of European Published Patent Application 0321872A which teaches the production of polymers by the free radical homo or copolymerisation of radically polymerisable monomers in an aqueous medium in which the initiator system is prepared in-situ by the addition of a peroxide-producing enzyme and one or more enzyme substrates in the presence of oxygen and decomposition of the peroxide produced with the formation of radicals. However the process of EP-A-0321872A is concerned with the use of such enzyme-induced polymerisation as a preparative technique for the production of the desired polymeric product, i.e. where one starts only with the monomer(s) to be polymerised (and not an already formed polymer dispersion) and effects polymerisation to form the required final polymer product. It is not concerned with, nor does it provide any teaching towards, the removal of residual monomer from an already-formed polymer dispersion produced by non-enzymic, usually conventional, means (as is intended in the present invention); indeed the thrust of EP-A-0321872A is to the use of the claimed process as an alternative to conventional processes for producing polymers. Moreover, the conversions of monomers to polymers disclosed in the examples of EP-A-0321872A are low ($\not>65\%$) and there is no teaching to remove residual monomers using the same type of enzymic polymerisation employed in the formation of the required polymeric product. The present invention is therefore believed to be novel and inventive with respect to the teaching of EP-A-0321872A.

The method of the invention can, as mentioned supra, be used for the removal of residual monomer or monomers from both homo and copolymers. In the case of copolymers, it will sometimes be the case that the residual monomeric material is constituted substantially wholly or in the main by only one of the comonomers used for the polymerisation, and the method of the invention could be targeted towards the removal of this residual monomer. Of course, should undesirable residual levels of two or more comonomers be present (as is more usually the case), the method of the invention may be directed towards the removal of each two or more comonomers.

The peroxide-generating enzyme is an enzyme which in conjunction with one or more enzyme substrates can form a radical-providing peroxide, preferably hydrogen peroxide. The presence of oxygen, in particular atmospheric oxygen, may often be required, and in such cases may itself possibly also be looked upon as an enzyme substrate (since one can consider an enzyme substrate to be a substance which can acts in concert with a peroxide-generating enzyme to form a peroxide), although it could alternatively be looked on as a substance on which an enzyme acts, in conjunction with an enzyme substrate, to form a peroxide.

Examples of suitable enzymes are oxidases, such as, for example, lactate oxidase, galactose oxidase, xanthine oxidase, L-2-hydroxy acid oxidase, glucose oxidase, glycolate oxidase, glycerine-3-phosphate-oxidase, hexose oxidase, L-gluconolactone oxidase, L-sorbose oxidase and pyridoxol-4-oxidase. An enzyme is used, in accordance with the invention, in conjunction with a substrate(s) suitable for the particular enzyme.

Examples of substances suitable as substrates include the following:

hydroxy carboxylic acids, such as hydroxyacetic acid, lactic acid or hydroxybutanoic acid;

sugar and sugar derivatives, such as galactose, glucoses such as beta-D(+)-glucose or D(+)-glucose, glycosides, acetylated glucose or galactose, disaccharides, trisaccharides, polysaccharides, sorbitol, glycolate, L-gulono- gamma -lactone, L-sorbose or pyridoxol;

phosphates, such as L-alpha-glycerine-3-phosphate;

diones, such as xanthine;

amino acids, such as glycine, alanine, methionine, lysine or cysteine, and peptides or glycoprotein.

A further possible enzyme is alcohol oxidase. This could be used with alcohols such as methanol, ethanol, n-propanol, n-butanol, allyl alcohol, benzyl alcohol, ethylene glycol or butyl glycol.

It may also be possible or desirable to employ coenzymes, depending on the actual enzyme used.

In the method of the invention, the polymer dispersion is treated with the peroxide—generating enzyme and enzyme substrate(s) under conditions to effect a reduction in the level of monomer or monomers, these conditions being presumed to produce a peroxide and form free radicals from the peroxide which effect polymerisation of residual monomeric material as manifested by a reduction in the level thereof.

Generally speaking, the method of invention (and hence the presumed formation of the peroxide and its decomposition into polymerising-initiating free radicals) will take place at moderately low temperatures, e.g. between 0° and 80° C., and often between 15° and 40° C. Consequently ambient temperature may often be used for effecting the method of the invention. The pH of the liquid medium can vary widely and can be e.g. between 1 and 12, although the range between 1 and 10 (3 and 10) is more preferred. When using such moderately low temperatures (particularly ambient temperatures) it will often be necessary to wait for a reasonably long period of time for the treatment to be properly effective, e.g. several days, or even a period of up to one or several weeks or more.

It may also be necessary, when using such moderate temperatures, to employ an accelerator compound in conjunction with the enzyme and enzyme substrate in order to achieve an acceptably fast reduction in monomer level (presumably by achieving an acceptably fast rate of decomposition of peroxide into polymerisation-initiating free radicals). Suitable accelerator compounds are normally reducing agents, examples of which include:

water-soluble salts of metals in their low valency states, such as iron-II or cobalt-II or copper-II salts, for example, iron-II-chloride or iron-II-sulphate;

reducing nitrogen compounds, such as hydroxylamine, hydrazine and their derivatives, such as, for example, sodium hydrazomethane disulphonate, and also amines, such as, for example, N,N-diethylaniline, N,N-dimethylaniline, N-phenyl diethanolamine or trihexylamine;

compounds containing sulphur (sometimes phosphorous), such as, for example, sulphur dioxide, sulphite, hydrogen sulphite, disulphite, dithionite, thiosulphate, sulphoxylate, formamidine sulphinic acid, hydrogen sulphide, mercaptanes, thiophenols and their salts, and also sodium hypophosphite;

organic reducing compounds, such as, those with endiol groups, for example, ascorbic acid, dihydroxymaleic acid, and also organic sulphinic acids.

Of course it may not always be necessary to employ an accelerator compound(s) (e.g. if the treatment temperature is relatively high—although this is not generally preferred), but it is often a necessary feature.

The level of enzyme used in the treatment will often be within the range of from 1 to 1500 units of enzyme per gram of the residual monomer(s) to be removed, more usually 10 to 500 units of enzyme per gram of residual monomer(s). An enzyme unit is the amount of enzyme which catalyses the reaction of a micromole of substrate per minute under standard conditions, the standard conditions depending on the particular enzyme/enzyme substrate system being used (and being given by the enzyme supplier, and also provided in enzyme handbooks). The level of substrate will depend on the particular enzyme being used, and on the particular nature of the substrate itself. Often, about 10 to 8000% by wt enzyme substrate, based on residual monomeric material, is used, more often about 100 to 2000% by wt. Where oxygen is required for the treatment (as is usual) it may simply be obtained from the surrounding environment—e.g. by allowing the dispersion to stand for a period of time open to the air, perhaps after a short period of initial stirring. The oxygen may also (or additionally) be provided by bubbling air (or oxygen) through the dispersion.

Where an accelerator compound (particularly a reducing agent) is employed, its level is usually within the range of from 0.1 to 250% by wt, based on the weight of residual monomeric material, more usually 1 to 100% by wt.

The level of residual monomer or monomers in the dispersion (before using the method of the invention) can vary quite widely. For example it may vary from 200 parts per million (ppm) (or below), based on the total weight of the dispersion (i.e. polymer, additives and the liquid medium), to 2000 or 3000 ppm or even more. Generally speaking it is often preferred that at least 95% (by wt) of the monomer or monomers used for the polymerisation has been removed (e.g. by the non-enzymic polymerisation process itself, possibly in conjunction with simple pre-treatment techniques such as venting), more usually at least 99% (by wt), and ideally at least 99.7% (by wt), before using the treatment employed in the method of the invention. Also, generally speaking, it is often preferred to remove $\geq 50\%$ (by wt) of the residual monomer or monomers remaining in the dispersion when using the method of the invention, and ideally at least 90% (by wt). A check on the initial and final levels of residual monomeric material can e.g. readily be effected using techniques such as gas phase chromatography.

In operation, the method of the invention may simply be carried out by individually adding the enzyme, enzyme substrate, and (if used) accelerator compound, usually dissolved or dispersed in a carrier medium (particularly water), to the polymer dispersion and allowing the dispersion to stand for a period of time (e.g. up to one or two or even several weeks, or more)—perhaps after an initial period of vigorous stirring (to ensure good access to oxygen if necessary). The polymer dispersion treated may be as directly produced from a polymerisation process, or it may be that which has subsequently been subjected to a formulation procedure (at any stage thereof) with an end application in mind.

In principle, the method of the invention may be applied to the removal of residual radically-polymerisable monomer or monomers from any homo or copolymer derived from olefinically unsaturated monomer(s). Examples of olefinically unsaturated monomers which may be homo or copolymerised to form such polymers, and which may therefore provide one or more of the residual monomers to be removed in the resulting dispersion, include conjugated dienes; styrene or substituted styrenes; vinyl halides; olefinically unsaturated acids, anhydrides, or amides; vinyl esters, vinyl ethers; vinyl ketones; olefinically unsaturated nitriles; heterocyclic vinyl compounds; and esters of acrylic acid and methacrylic acid of formula:

$$CH_2=CR^1COOR^2$$

where $R^1$ is H or methyl and $R^2$ is optionally substituted (e.g. optionally halo, amino, hydroxy, or oxyalkyl substituted) alkyl or cycloalkyl of 1 to 20 carbon atoms (more preferably 1 to 10 carbon atoms) and the residual monomer(s) to be removed includes one or more of such monomers. More specific examples of such monomers include acids, amides, and anhydrides such as acrylic acid, methacrylic acid, beta-carboxyethyl acrylate, fumaric acid, and itaconic acid; maleimide, acrylamide, methacrylamide, and itaconamide; and maleic anhydride; alkyl or substituted alkyl esters such as methyl acrylate, ethyl acrylate, n-propyl acrylate, isobutyl acrylate, tert.butyl acrylate, n-butyl acrylate, n-octyl acrylate, iso-octyl acrylate, 2-ethylhexyl acrylate, lauryl acrylate, isopropyl acrylate, cyclohexyl acrylate, isobornyl acrylate, methyl alpha-chloroacrylate, ethyl alpha-chloroacrylate, n-propyl alpha-chloroacrylate, n-butyl alpha-chloroacrylate, beta-chloroethyl acrylate, beta-chloropropyl acrylate, beta-chlorobutyl acrylate, fluorinated acrylates and methacrylates (such as the fluoro analogues of the above chloroacrylates), N-diethylaminoethyl acrylate, N-tert-butylaminoethyl methacrylate, N-tert-butylaminoethyl acrylate, methyl methacrylate, ethyl methacrylate, isobutyl methacrylate, tert-butyl methacrylate, n-propyl methacrylate, isopropyl methacrylate, n-butyl methacrylate, iso-octyl methacrylate, 2-ethylhexyl methacrylate, diethyl maleate, cyclohexyl methacrylate, isobornyl methacrylate, diethyl fumarate, beta-hydroxyethyl acrylate, beta-hydroxyethyl methacrylate, beta-hydroxypropyl acrylate, beta-hydroxypropyl methacrylate; vinyl esters such as allyl acetate, allyl chloroacetate, methallyl acetate, vinyl acetate, isopropenyl acetate; oxyalkyl esters such as ethoxyethyl acrylate, ethoxyethyl methacrylate; halides such as vinyl chloride, vinylidene chloride, allyl chloride, 1,2-dichloropropene-2, methallyl chloride and trichloroethylene; nitriles such as acrylonitrile and methacrylonitrile; aryls such as styrene, alpha-methyl styrene, o-methyl styrene, m-methyl styrene, p-methyl styrene, p-tert-butyl styrene, vinyl toluene, pentachlorostyrene, o-chlorostyrene, m-chlorostyrene, p-chlorostyrene, m-bromostyrene, p-bromostyrene, 2,5-dichlorostyrene, p-dimethylamino styrene, p-methoxystyrene and p-cyanostyrene; conjugated dienes or chlorodienes such as butadiene, isoprene and chloroprene; vinyl-substituted heterocyclic imines such as 2-vinylpyridine and vinyl carbaxole; and vinyl ketones such as methyl vinyl ketone, and diacetone acrylamide.

The method of the invention is especially suitable for the removal of residual acrylate and methacrylate monomers from acrylic and methacrylic polymers. Typically, the residual monomers to be removed include alkyl acrylate and/or methacrylate esters and usually the alkyl groups are $C_1$ to $C_{10}$ alkyl groups, for example, methyl, ethyl, n-butyl and 2-ethylhexyl alkyl groups. Other residual monomers which will commonly be required to be removed from such polymers are acrylonitrile and styrene. Aqueous latices of such polymers, together possibly with pigments, fillers, and other additives, are commonly used in covering and coating formulations.

It is also possible for the method of the invention to be applied to a composite polymer system such as, for example, a simple blend of preformed polymers (where at least one has residual olefinically unsaturated monomeric material), or a more complex composite polymer system such as where a polymer(s) prepared from the (co)polymerisation of olefinically unsaturated monomer(s) (and having residual olefinically unsaturated monomeric material) is formed by polymerisation of the monomers in the presence of another type of polymer, e.g. a polyurethane, polyester, polyamide, or polyimide polymer - or such another type of polymer could be formed in the presence of the already-formed olefinic polymer (i.e. vice versa). Examples of such composite polymer systems (simple or more complex as mentioned above) include urethane-(meth)acrylics, cellulose (or derivatives)-(meth)acrylics, polyester (including alkyd resins)-(meth) acrylics, polyamide-(meth)acrylics, fluoropolymer-(meth)acrylics, and polyimide-(meth)acrylics.

The present invention is now illustrated by reference to the following examples. Unless otherwise specified, all parts, percentages and ratios are on a weight basis. The prefix C before an example number denotes that it is comparative.

In the examples, the following abbreviations are used.

| | |
|---|---|
| AA | acrylic acid |
| AN | acrylonitrile |
| BA | n-butyl acrylate |
| EA | ethyl acrylate |
| MAA | methacrylic acid |
| MMA | methylmethacrylate |
| S | styrene |
| demi water | demineralised water |
| Tg | glass transition temperature |
| RT | room or ambient temperature (20-25° C.) |
| ppm | parts per million |
| n.d. | not determined |

The words Akyposal and Surfagene used herein are believed to be registered trade marks.

A series of aqueous polymer dispersions PD(l), PD(2), PD(3), PD(4) and PD(5) were prepared for use in the examples, being aqueous latices of the following polymers:

PD(1): BA/S/MMA/AA=48.77/43/3.23/5 copolymer with a calculated Tg of 5° C.

PD(2): BA/S/MMA/AA=17.84/43/34.16/5 copolymer with a calculated Tg of 60° C.

PD(3): EA/BA/MMA/MAA=60/14.02/14.58/11.4 copolymer with a calculated Tg of 0° C.

PD(4): EA/BA/S/MAA=60/13.74/14.86/11.4 copolymer with a calculated Tg of 0° C.

PD(5): S/AN/BA/MAA=5.96/20/69.04/5 copolymer with a calculated Tg of −20° C.

(The FIGURES refer to the relative levels of starting monomers).

These aqueous polymer dispersions were prepared using the following recipes and procedures. (All reactions were carried out under nitrogen). The % conversions of monomeric material to polymer were estimated at 95-99%.

Preparation of PD(1) and PD(2)

Recipes:

| No. | Component | PD(1) g | PD(2) g |
|---|---|---|---|
| 1 | Water (demi) | 941.832 | 941.832 |
| 2 | Akyposal SLS* | 33.097 | 33.097 |
| 3 | Potassium persulphate | 1.563 | 1.563 |
| 4 | NaHCO$_3$ | 0.999 | 0.999 |
| 5 | BA | 388.946 | 142.255 |
| 6 | AA | 39.876 | 39.876 |
| 7 | S | 342.933 | 342.933 |
| 8 | MMA | 25.764 | 272.455 |
| 9 | Water (demi) | 25.000 | 25.000 |

| No. | Component | PD(1) g | PD(2) g |
|---|---|---|---|
| 10 | Water (demi) | 275.61 | 275.61 |

*Akyposal SLS is sodium lauryl sulphate (30% w/w).

Procedure:

1, 2, 3 and 4 were added to a polymerisation reator. All components were mixed until they were dissolved. 10% of the mixture of 5, 6, 7 and 8 was added to the reactor. The reator contents were heated to 90±2° C. and the rest of the monomer mixture 5, 6, 7 and 8 was added to the reactor in 70 minutes. 175.61 grams of 10 were added to the reactor after 50 minutes of feeding. 9 and the remaining 100 grams of 10 were added to the reactor after the feed was complete. The reaction mixture was held at 90±2° C. for another 30 minutes and then cooled down to room temperature. The resulting dispersion was sieved through a 200 mesh screen.

To 950 grams of PD(1) were added 18.3 grams of $NH_3$ (aq) (12.5% w/w) to adjust the pH to 7.

To 950 grams of PD(2) were added 14.85 grams of $NH_3$ (aq) (12.5% w/w) to adjust the pH to 7.

Preparation of PD(3) and PD(4)

| No. | Component | PD(3) g | PD(4) g |
|---|---|---|---|
| 1 | Water (demi) | 544.871 | 544.871 |
| 2 | Akyposal SLS* | 17.889 | 17.889 |
| 3 | Ammonium persulphate | 0.806 | 0.806 |
| 4 | Water (demi) | 434.775 | 434.775 |
| 5 | Akyposal SLS* | 60.262 | 60.262 |
| 6 | Ammonium persulphate | 2.715 | 2.715 |
| 7 | Lauryl mercaptane | 6.97 | 6.97 |
| 8 | S | 0 | 104.612 |
| 9 | MMA | 102.681 | 0 |
| 10 | BA | 98.682 | 96.75 |
| 11 | EA | 422.438 | 422.438 |
| 12 | MAA | 80.263 | 80.263 |
| 13 | $NH_3$(aq) 25% (w/w) | 2.665 | 2.665 |
| 14 | Water (demi) | 24.984 | 24.984 |

*Akyposal SLS is sodium lauryl sulphate (30% w/w).

Procedure:

1, 2, and 3 were charged to a polymerisation reactor. The pH was adjusted with $NH_3$ (aq) to 8–8.5. 4, 5 and 6 were charged to a feed tank and mixed. Then, 8, 9, 10, 11 and 12 were charged to the feed tank. The content of the feed tank was mixed until a stable emulsion was obtained. Finally 7 was added to the stable emulsion. 5% of the emulsified feed was added to the reactor. The reator contents were heated to 88° C. and the rest of the emulsified feed was added to the reactor. The reaction temperature was 92±2° C.; the total feed time was 60 minutes. After the feed was complete, 14 was added to rinse the feed tank. The dispersion was held at 92±2° C. for another 10 minutes, before cooling down to room temperature. The resulting dispersion was sieved through a 200 mesh screen.

To 950 grams of PD(3) were added 20.5 grams of a $NH_3$ (aq) solution (12.5% w/w) and 9.45 grams of water (demi) to adjust the pH to 7.

To 800 grams of PD(4) were added 13.15 grams of a $NH_3$ (aq) solution (12.5% w/w) and 129.85 grams of water (demi) to adjust the pH to 7.

Preparation of PD(5)

Recipe:

| No. | Component | PD(5) g |
|---|---|---|
| 1 | Water (demi) | 717.11 |
| 2 | Akyposal SLS* | 5.553 |
| 3 | Surfagene FAZ-109 V** | 83.294 |
| 4 | $NH_3$ (aq) (25%) | 3.09 |
| 5 | Water (demi) | 122.622 |
| 6 | Surfagene FAZ-109 V** | 8.328 |
| 7 | Potassium persulphate | 2.082 |
| 8 | S | 49.673 |
| 9 | AN | 166.585 |
| 10 | BA | 575.023 |
| 11 | MAA | 41.646 |
| 12 | Water (demi) | 188.37 |
| 13 | Water (demi) | 24.984 |
| 14 | t-butylhydroperoxide mixture*** | |
| 15 | i-ascorbic acid solution (12% w/w) | 20.82 |
| 16 | t-butylhydroperoxide mixture*** | 4.998 |

*Akyposal SLS is sodium lauryl sulphate (30% w/w).
**Surfagene FAZ-109 V is an emulsifier.
***mixture of 1.0 g t.butylhydroperoxide (78% w/w), 2.08 g Akposal SLS and 1.6 g water (demi).

Procedure:

1, 2, 3, and 4 were added to a polymerisation reactor and mixed till all components were dissolved. 5, 6, and 7 were added to a feed tank and mixed till all components were dissolved. Then 8, 9, 10 and 11 were added to a second feed tank. 5% of the monomer feed 8-11 was added to the reactor. The reaction mixture was heated to 82° C. and kept at that temperature for 15 minutes. The monomer feed was added to the reactor in 120 minutes at 82±2° C. The initiator feed (5, 6, and 7) was started simultaneously. Total feed time for the initiator feed was 135 minutes. After having fed for 80 minutes, 12 was added to the reactor. The second feed tank was rinsed with 13. The batch was held at 80°–82° C. for 30 minutes after the feeds were complete. Then 14 was added, followed by 15. Feed time for 15 was 60 minutes at 80°–82° C. 16 was added 30 minutes after the start of 15. The resulting dispersion was cooled down to room temperature and sieved through a 200 mesh screen.

To 950 grams of PD(5) were added 0.1 grams of $NH_3$ (aq) (12.5% w/w) and 50 grams of water (demi) to adjust the pH to 7.

The above-described polymer dispersions were used in a series of examples (following) to examine the effects of adding one or more of enzyme (glucose-oxidase), enzyme substrate (glucose) and reducing agent (FeII solution) on the levels of residual monomers therein. In all treatments there was good access to atmospheric oxygen. The levels of individual residual monomers were determined by direct injection gas chromatography. The accuracy was estimated at levels <100 ppm free monomer to be about ±15%, and above 100 ppm about ±10%.

For use in these examples the following were prepared:

A solution of beta-D(+)-glucose in demi water was made, which contained 60 mg of beta-D(+)-glucose per ml.

A solution of D(+)-glucose in demi water was made, which contained 60 mg of D(+) glucose per ml.

A solution of glucose-oxidase in demi water was made which contained 0.01 mg/ml (this enzyme contained 20000 units/190 mg of enzyme).

A solution of $FESO_4$ in demi water was made which contained 1 mg/ml.

EXAMPLES 1 TO 12

The Table 1 below summarises the treatment of PD(1) with one or more of enzyme solution, glucose solution and FE(II) solution.

Demi-water was added to the stirred dispersion, followed by one or more of the beta-D(+)-glucose solution (or D(+)-glucose solution), the glucose oxidase solution and the FE(II) solution. The mixture was stirred for 15 minutes and set aside at ambient temperature (20°-25° C.). The various addition regimes are shown in Table 1, together with the levels of residual monomers after 7 days at ambient temperature. Example C1 is a control with only water having been added.

TABLE 1

| Ex. No. | Addition Regime[a] | Free monomer after 7 days at RT (ppm) | | |
|---|---|---|---|---|
| | | MMA | BA | S |
| C1 | 0 | <100 | 5120 | 980 |
| 2 | 1 | <100 | 200 | <50 |
| C3 | 2 | <100 | 5100 | 1000 |
| C4 | 3 | <100 | 4940 | 965 |
| C5 | 4 | <100 | 4910 | 990 |
| C6 | 5 | <100 | 5100 | 1000 |
| C7 | 6 | <100 | 4900 | 960 |
| C8 | 7 | <100 | 5130 | 990 |
| 9 | 8 | <100 | 310 | <100 |
| 10 | 9 | <100 | 545 | <100 |
| 11 | 10 | <100 | 580 | <100 |
| 12 | 11 | <100 | 470 | <100 |

[a]Addition Regimes:
0 Only water (demi) was added to 50 grams of the dispersion to reach the same end volume as in addition regime 1 (74.188 ml).
1 Per 50 g dispersion where added:
5 ml of water (demi).
19.013 ml of the beta-D(+)-glucose solution.
16.725 ml of the glucose-oxidase solution.
33.450 ml of the FeSO₄ solution.
2 Per 50 grams of dispersion were added:
Water (demi) to obtain the same end volume as in regime 1.
19.013 ml of the beta-D(+)-glucose solution.
3 Per 50 grams of dispersion were added:
Water (demi) to obtain the same end volume as in regime 1.
16.725 ml of the glucose-oxidase solution.
4 Per 50 g dispersion were added:
Water (demi) to obtain the same end volume as in regime 1.
33.450 ml of the FeSO₄ solution.
5 Per 50 grams of dispersion were added:
Water (demi) to obtain the same end volume as in regime 1.
19.013 ml of the beta-D(+)-glucose solution.
16.725 ml of the glucose-oxidase solution.
6 Per 50 g dispersion were added:
Water (demi) to obtain the same end volume as in regime 1.
16.725 ml of the glucose-oxidase solution.
33.450 ml of the FeSO₄ solution.
7 Per 50 g dispersion were added:
Water (demi) to obtain the same end volume as in regime 1.
33.450 ml of the FeSO₄ solution.
19.013 ml of the beta-D(+)-glucose solution.
8 Per 50 g dispersion were added:
14.4506 ml of water (demi).
9.507 ml of the beta-D(+)-glucose solution.
16.725 ml of the glucose-oxidase solution.
33.450 ml of the FeSO₄ solution.
9 Per 50 g dispersion were added:
19.260 ml of water (demi).
4.7532 ml of the beta-D(+)-glucose solution.
16.725 ml of the glucose-oxidase solution.
33.450 ml of the FeSO₄ solution.
10 Per 50 g dispersion were added:
5 ml of water (demi).
19.013 ml of the D(+)-glucose solution.
16.725 ml of the glucose-oxidase solution.
33.450 ml of the FeSO₄ solution.
11 Per 50 g dispersion were added:
5 ml of water (demi).
19.013 ml of another D(+)-glucose solution which contained 120 mg D(+)-glucose per ml.
16.725 ml of the glucose-oxidase solution.
33.450 ml of the FeSO₄ solution.

It will be noted that for this dispersion PD(1) with the system being used it was necessary when using ambient temperature treatment to add reducing agent as well as enzyme and enzyme substrate to provide conditions for effecting a reduction in the level of residual monomers.

EXAMPLES 13 AND 14

The Table 2 below summarises the treatment of PD (2) with the enzyme solution, glucose solution and FE(II) solution.

Demi-water was added to the stirred dispersion, followed (in Addition Regime 1) by the beta-D(+)-glucose solution, the glucose oxidase solution and the FE(II) solution. The mixture was stirred for 15 minutes and set aside at ambient temperature (20°-25° C.). Example C13 is a control with only water having been added. The levels of residual monomers after 1 and 7 days at ambient temperature are shown in Table 2.

TABLE 2

| Ex. No. | Addition Regime[a] | Free monomer after 1 day at RT (ppm) | | | Free monomer after 7 days at RT (ppm) | | |
|---|---|---|---|---|---|---|---|
| | | MMA | BA | S | MMA | BA | S |
| C13 | 0 | 430 | 860 | 340 | 420 | 855 | 330 |
| 14 | 1 | 345 | 715 | 360 | 110 | 635 | 180 |

[a]Addition Regimes:
0 Only water (demi) added to 50 grams of the dispersion to reach the same end volume as in addition regime 1 (74.188 ml).
1 Per 50 g dispersion were added:
5 ml of water (demi).
19.013 ml of the beta-D(+)-glucose solution.
16.725 ml of the glucose-oxidase solution.
33.450 ml of the FeSO₄ solution.

EXAMPLES 15 TO 22

The Table 3 below summarises the treatment of PD(3) with one or more of the enzyme solution, glucose solution and Fe(II) solution.

Demi-water was added to the stirred dispersion, followed by one or more of the beta-D(+)-glucose solution (or D(+)-glucose solution), the glucose oxidase solution and the Fe(II) solution. The mixture was stirred for 15 minutes and set aside at ambient temperature (20°-25° C.). The various addition regimes are shown in Table 3, together with the levels of residual monomers after 1 and 7 days at ambient temperature. Example C15 is a control with only water having been added.

TABLE 3

| Ex. No. | Addition Regime[a] | Free monomer after 1 day at RT (ppm) | | | Free monomer after 7 days at RT (ppm) | | |
|---|---|---|---|---|---|---|---|
| | | MMA | BA | EA | MMA | BA | EA |
| C15 | 0 | <100 | 135 | 520 | <100 | 120 | 540 |
| 16 | 1 | <100 | <50 | 105 | <50 | <50 | <50 |
| C17 | 2 | n.d. | n.d. | n.d. | <100 | 115 | 540 |
| 18 | 3 | n.d. | n.d. | n.d. | <100 | <50 | 340 |
| 19 | 4 | n.d. | n.d. | n.d. | <50 | <50 | 80 |
| 20 | 5 | n.d. | n.d. | n.d. | <50 | <50 | <50 |
| 21 | 6 | n.d. | n.d. | n.d. | <50 | <50 | <50 |

TABLE 3-continued

| Ex. No. | Addition Regime[a] | Free monomer after 1 day at RT (ppm) | | | Free monomer after 7 days at RT (ppm) | | |
|---|---|---|---|---|---|---|---|
| | | MMA | BA | EA | MMA | BA | EA |
| 22 | 7 | n.d. | n.d. | n.d. | <50 | <50 | <50 |

[a]Addition Regimes:
0 Only water (demi) was added to 50 grams of the dispersion to reach the same end volume as in addition regime 1 (74.188 ml).
1 Per 50 g dispersion were added:
5 ml of water (demi).
19.013 ml of the beta-D(+)-glucose solution.
16.725 ml of the glucose-oxidase solution.
33.450 ml of the FeSO$_4$ solution.
2 Per 50 grams of dispersion were added:
Water (demi) to obtain the same end volume as in regime 1.
33.450 ml of the FeSO$_4$ solution.
3 Per 50 grams of dispersion were added:
Water (demi) to obtain the same end volume as in regime 1.
19.013 ml of the beta-D(+)-glucose solution.
16.725 ml of the glucose-oxidase solution.
4 Per 50 g dispersion were added:
14.506 ml of water (demi).
9.507 ml the beta-D(+)-glucose solution.
16.725 ml of the glucose-oxidase solution.
33.450 ml FeSO$_4$ solution.
5 Per 50 grams of dispersion were added:
19.260 ml of water (demi).
4.7532 ml of the beta-D(+)-glucose solution.
16.725 ml of the glucose-oxidase solution.
33.450 ml FeSO$_4$ solution.
6 Per 50 g dispersion were added:
5 ml of water (demi).
19.013 ml of the D(+)-glucose solution.
16.725 ml of the glucose-oxidase solution.
33.450 ml of the FeSO$_4$ solution
7 Per 50 g dispersion were added:
5 ml of water (demi).
19.013 ml of another D(+)-glucose solution which contained 120 mg D(+)-glucose per ml.
16.725 ml of the glucose-oxidase solution.
33.450 ml of the FeSO$_4$ solution.

It will be noted that for this dispersion PD(3) with the system being used, the ambient temperature treatment provided conditions for effecting reduction in the level of the BA and EA residual monomers (though not MMA) even when reducing agent was not added in addition to enzyme and enzyme substrate (see Example 18), although better results were nevertheless obtained when it was added (Examples 16, 19 to 22).

EXAMPLES 23 TO 26

The Table 4 below summarises the treatment of PD(4) with one or more of enzyme solution, glucose solution and Fe(II) solution.

Demi-water was added to the stirred dispersion, followed by one or more of the beta-D(+)-glucose solution, the glucose oxidase solution and the Fe(II) solution. The mixture was stirred for 15 minutes and set aside at ambient temperature (20°–25° C.). The various addition regimes are shown in Table 4, together with the levels of residual monomers after 7 days at ambient temperature. Example C23 is a control with only water having been added.

TABLE 4

| Ex. No. | Addition Regime[a] | Free monomer after 7 days at RT (ppm) | | |
|---|---|---|---|---|
| | | BA | S | EA |
| C23 | 0 | 155 | <100 | 745 |
| 24 | 1 | <50 | <50 | 240 |
| C25 | 2 | 155 | <100 | 755 |

TABLE 4-continued

| Ex. No. | Addition Regime[a] | Free monomer after 7 days at RT (ppm) | | |
|---|---|---|---|---|
| | | BA | S | EA |
| 26 | 3 | 110 | <100 | 500 |

[a]Addition Regimes:
0 Only water (demi) was added to 50 grams of the dispersion to reach the same end volume as in addition regime 1 (69.190 ml).
1 Per 50 g dispersion were added:
41.515 ml of water (demi).
7.605 ml of the beta-D(+)-glucose solution.
6.690 ml of the glucose-oxidase solution.
13.380 ml of the FeSO$_4$ solution.
2 Per 50 grams of dispersion were added:
Water (demi) to obtain the same end volume as in regime 1.
13.380 ml of the FeSO$_4$ solution.
3 Per 50 grams of dispersion were added:
Water (demi) to obtain the same end volume as in regime 1.
7.605 ml of the beta-D(+)-glucose solution.
6.690 ml of the glucose-oxidase solution.

It will be noted that for this dispersion PD(4) with the system being used, the ambient temperature treatment provided conditions for effecting a reduction in the level of BA and EA (but not S) residual monomers even when reducing agent was not added in addition to enzyme substrate (see Example 26), although a better result was obtained when it was added (Example 24).

EXAMPLES 27 TO 30

The Table 5 below summarises the treatment of PD(5) with one or more of the enzyme solution, glucose solution and Fe (II) solution.

Demi-water was added to the stirred dispersion, followed by one ore more of the beta-D(+)-glucose solution, the glucose oxidase solution and the FE(II) solution. The mixture was stirred for 15 minutes and set aside at ambient temperature (20°–25° C.). The various addition regimes are shown in Table 5, together with the levels of residual monomers, after 7 days at ambient temperature. Example C27 is a control with only water having been added.

TABLE 5

| Ex. No. | Addition Regime[a] | Free monomer after 7 days at RT (ppm) | | |
|---|---|---|---|---|
| | | BA | S | An |
| C27 | 0 | 225 | <100 | 110 |
| 28 | 1 | 110 | <50 | 20 |
| C29 | 2 | 220 | <100 | 95 |
| 30 | 3 | 240 | <100 | 65 |

[a]Addition Regimes:
0 Only water (demi) was added to 50 grams of the dispersion to reach the same end volume as in addition regime 1 (74.188 ml).
1 Per 50 g dispersion were added:
5 ml of water (demi).
19.013 ml of the beta-D(+)-glucose solution.
16.725 ml of the glucose-oxidase solution.
33.450 ml of the FeSO$_4$ solution.
2 Per 50 grams of dispersion were added:
Water (demi) to obtain the same end volume as in addition regime 1.
33.450 ml of the FeSO$_4$ solution.
3 Per 50 grams of dispersion were added:
Water (demi) to obtain the same end volume as in addition regime 1.
19.013 ml of the beta-D(+)-glucose solution.
16.725 ml of the glucose-oxidase solution.

It will be noted that for this dispersion PD(5) with the system being used, the ambient temperature treatment provided conditions for effecting a reduction in the level of residual AN monomer (but not residual BA and S monomers) even when reducing agent was not added in addition to enzyme and enzyme substrate (see Example 30), although a better result was obtained when it was added (Example 28, with a reduction in the levels of all residual monomers being achieved).

We claim:

1. Method for the removal of free radical-polymerisable olefinically unsaturated monomer or monomers from a dispersion in a liquid medium of a polymer prepared from at least one olefinically unsaturated monomer using a polymerisation process which does not employ an enzyme and containing a residual level of free radical-polymerisable olefinically unsaturated monomer or monomers used in said polymerisation process, wherein said method comprises treating the dispersion with a peroxide-generating enzyme and an enzyme substrate(s) for the enzyme under conditions where they effect a reduction in the level of said residual monomer or monomers in the dispersion.

2. Method according to claim 1 wherein said treatment is effected in the presence of oxygen.

3. Method according to either claim 1 or claim 2 wherein said peroxide-generating enzyme is one which generates hydrogen peroxide.

4. Method according to any one of the preceding claims wherein the enzyme used is an oxidase.

5. Method according to claim 4 wherein said enzyme is selected from glucose oxidase, lactate oxidase, galactose oxidase, xanthine oxidase, L-2-hydroxy acid oxidase, glycolate oxidase, L-gluconolactone oxidase, L-sorbose oxidase, pyridoxol-4-oxidase and alcohol oxidase.

6. Method according to any one of the preceding claims wherein the enzyme substrate(s) is selected from hydroxy carboxylic acids, sugar and sugar derivatives, phosphates, diones, amino acids and alcohols.

7. Method according to any one of the preceding claims wherein the enzyme employed is glucose oxidase and the enzyme substrate is beta-D(+)-glucose and/or D(+)-glucose.

8. Method according to any one of the preceding claims wherein an accelerator compound(s) is employed in conjunction with the enzyme and enzyme substrate(s).

9. Method according to claim 8 wherein said accelerator compound is a reducing agent.

10. Method according to claim 9 wherein said accelerator compound is a water-soluble salt of a metal in a low valency state.

11. Method according to claim 10 wherein said water-soluble metal salt is an iron-II salt, a cobalt-II-salt, or a copper-II-salt.

12. Method according to any one of the preceding claims wherein said method is effected at a temperature between 0° and 80° C.

13. Method according to claim 12 wherein said temperature is between 15° and 40° C.

14. Method according to claim 12 or claim 13 wherein said temperature is ambient temperature.

15. Method according to any one of the preceding claims wherein the pH of the liquid medium is between 1 and 10.

16. Method according to any one of the preceding claims wherein said method removes $\geq 50\%$ by weight of residual monomer or monomers in the dispersion.

17. Method according to any of the preceding claims wherein the level of enzyme used is within the range of from 1 to 1500 units of enzyme per gram of residual monomer(s).

18. Method according to any one of the preceding claims wherein the level of enzyme substrate(s) used is within the range of from 10 to 8000% by weight based on the weight of residual monomer(s).

19. Method according to any one claims 9 to 11 wherein the level of accelerator compound used is within the range of from 0.1 to 250% by weight based on the weight of residual monomer(s).

20. Method according to any one of the preceding claims wherein said polymer has been formed from a free radical-initiated polymerisation process using an initiator or initiator system in which the initiating species are generated thermally or photolytically optionally in conjunction with an accelerator.

21. Method according to any one of the preceding claims wherein the liquid medium is an aqueous medium.

22. Method according to claim 21 wherein the dispersion is an aqueous polymer emulsion.

23. Method according to any one of the preceding claims wherein said polymer is a homo-or copolymer derived from one or more of: conjugated dienes; styrene or substituted styrenes; vinyl halides; olefinically unsaturated acids, anhydrides, or amides; vinyl esters; vinyl ethers, vinyl ketones, olefinically unsaturated nitriles; heterocyclic vinyl compounds; and esters of acrylic acid and methacrylic acid of formula $$CH_2=CR^1COOR^2$$

where $R^1$ is H or methyl and $R^2$ is optionally substituted alkyl or cycloalkyl of 1 to 20 carbon atoms, and the residual monomer(s) to be removed includes one or much of such monomers.

24. Method according to claim 23 wherein said polymer is an acrylic or methacrylic polymer.

25. Method according to claim 24 wherein the residual monomer(s) to be removed include one or more of alkyl (meth)acrylates in which the alkyl groups are C1 to C10 alkyl groups, acrylonitrile and styrene.

26. Method according to any one of the preceding claims wherein at least 95% by weight of the monomer or monomers used for the polymerisation to form said polymer has been removed before treatment with the enzyme and enzyme substrate(s).

27. Method according to any one of the preceding claims wherein said polymer is or forms part of a composite polymer system.

28. A dispersion of a polymer in a liquid medium which has been treated to remove residual monomer or monomers using a method according to any one of the preceding claims.

29. A dispersion according to claim 28 which is or provides a component of a coating, adhesive or ink composition.

* * * * *